May 26, 1959

C. C. SMITH 2,887,717

APPARATUS FOR MAKING DENTURES

Filed Feb. 4, 1957

INVENTOR.
Clark C. Smith
BY
ATTORNEY.

May 26, 1959
C. C. SMITH
2,887,717
APPARATUS FOR MAKING DENTURES
Filed Feb. 4, 1957
2 Sheets-Sheet 2
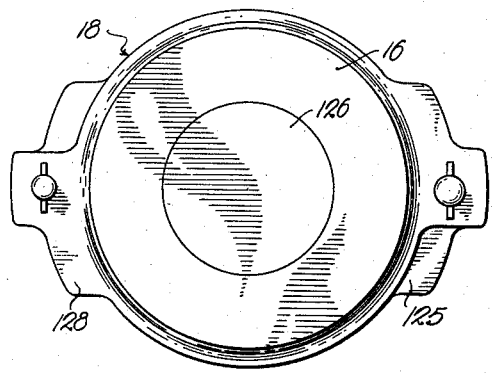
Fig. 3.
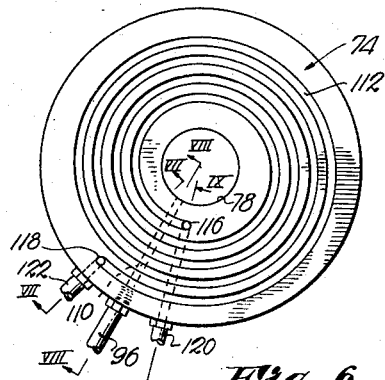
Fig. 6.
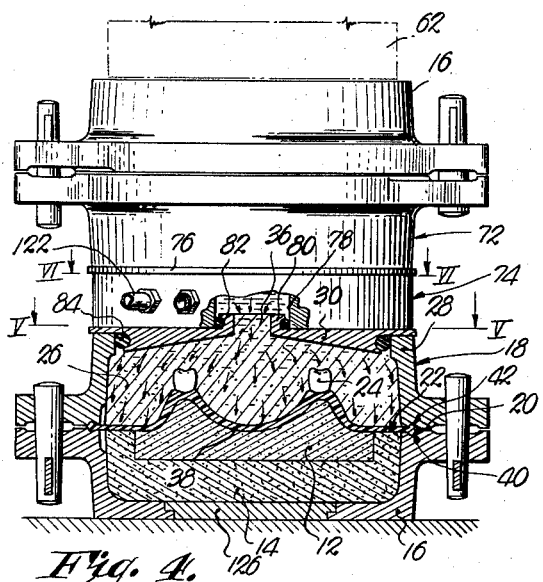
Fig. 4.
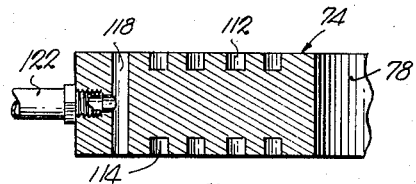
Fig. 7.
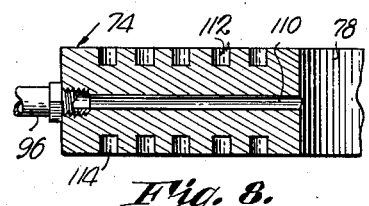
Fig. 8.
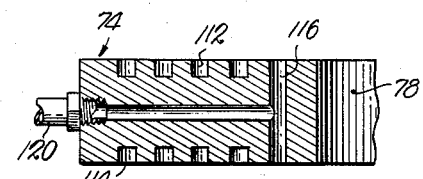
Fig. 9.
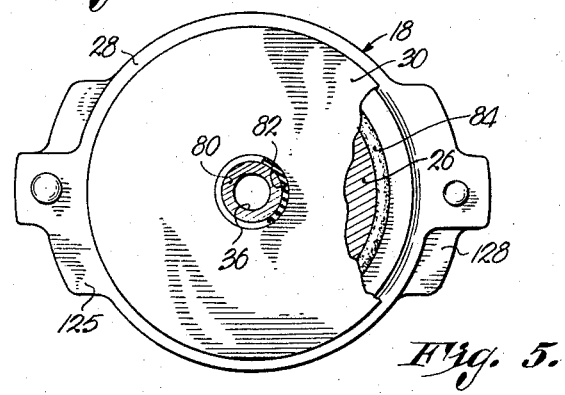
Fig. 5.
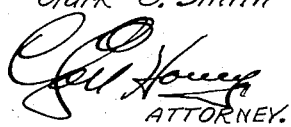
INVENTOR.
Clark C. Smith
BY
ATTORNEY.

U̇nited States Patent Office 2,887,717
Patented May 26, 1959

2,887,717
APPARATUS FOR MAKING DENTURES
Clark C. Smith, Kansas City, Mo.
Application February 4, 1957, Serial No. 637,974
9 Claims. (Cl. 18—5.7)

This invention relates to prosthetic dentistry and more particularly, to the manufacture of partial or complete dentures, the primary object being to alleviate problems incident to volumetric shrinkage resulting especially from employment of modern-day denture materials and making it virtually impossible to produce a well fitting appliance by commonly employed methods.

To a large extent, the dough from which dentures are universally made, consists wholly or in part of acrylic resin and during the curing of the dentures, such dough undergoes an appreciable volumetric shrinkage. Manifestly, such shrinkage occurs during polymerization and following the condensation thereof into a relatively hard solid structure.

By virtue of such shrinkage therefore, it is virtually impossible to expect that the finished appliance will conform in any accurate sense to the shape and configuration of the cast from which it is made and, therefore, cannot possibly fit the mouth of the user with any degree of accuracy. Such shrinkage occurs in virtually all directions, i.e., in thickness, length and breadth. Usually the denture is too narrow from ridge to ridge across the posterior and there is a notable linear shrinkage from the anterior to the posterior. However, the most notable error consists of a space between the denture and the cast, not only in the palate of the denture, but at the crest of the ridge due not only to the pulling away of the denture plate material from the cast, but from warpage by virtue of the fact that the volumetric shrinkage is permitted to take place uninhibited through conventional techniques.

In my copending application, Serial No. 566,413, filed February 20, 1956, there is disclosed and claimed a method of manufacturing artificial dentures which contemplates the control of such volumetric shrinkage so as to reduce, if not eliminate, the extent of variance in the shape and dimensions of the denture plate material with respect to the cast or positive dental model from which the denture is made.

It is the most important object of the present invention, therefore, to provide apparatus for making dental appliances capable of maintaining pressure upon the denture plate material while the same is cured so as to hold it firmly against the positive pattern and thereby cause the same to accurately take on the shape and configuration of such pattern.

Another important object of the present invention is to provide apparatus capable of imparting differential pressures on opposite sides of the denture plate material during curing thereof so that the same is caused to assume the shape and configuration of the cast, and to maintain such shape and configuration throughout the time the same condenses into a hard, solid denture with the result that the latter accurately fits the mouth of the user and engages the tissues uniformly throughout the palate, gum area and the ridge crest.

A further object of the present invention is to provide apparatus for making dental appliances in accordance with the method of my copending application above set forth, which apparatus includes a novel manifold usable not only for the aforementioned purpose of directing a fluid under pressure to the dental flask, but which may be employed after curing of the denture material to cool the latter and thereby prevent or appreciably reduce the tendency of the denture to pull away from the model as the result of the differences in the coefficient of expansion of the investment and the denture material.

Other objects include the provision of an improved dental flask especially adapted for use in carrying out the method and employing the apparatus of the instant invention; the utilization of an accumulator capable of maintaining the fluid pressure on the flasks; the provision of means to facilitate removal of the investment from the flask sections; and many important details of construction to be made clear as the following specification progresses.

In the drawings:

Fig. 3 is a bottom view of the dental flask used with the apparatus shown in Figs. 1 and 2.

Fig. 4 is an elevational view on an enlarged scale showing a pair of flasks in the nature of that illustrated in Fig. 3 in an operable position within the dental press, parts being in section for clearness.

Fig. 5 is a plan view of the flask, parts being broken away for clearness.

Fig. 6 is a plan view of the manifold shown in Figs. 1, 2 and 4.

Figs. 7, 8 and 9 are enlarged, fragmentary, cross-sectional views taken on corresponding section lines in Fig. 6.

Figures 1, 2, 10, 11:
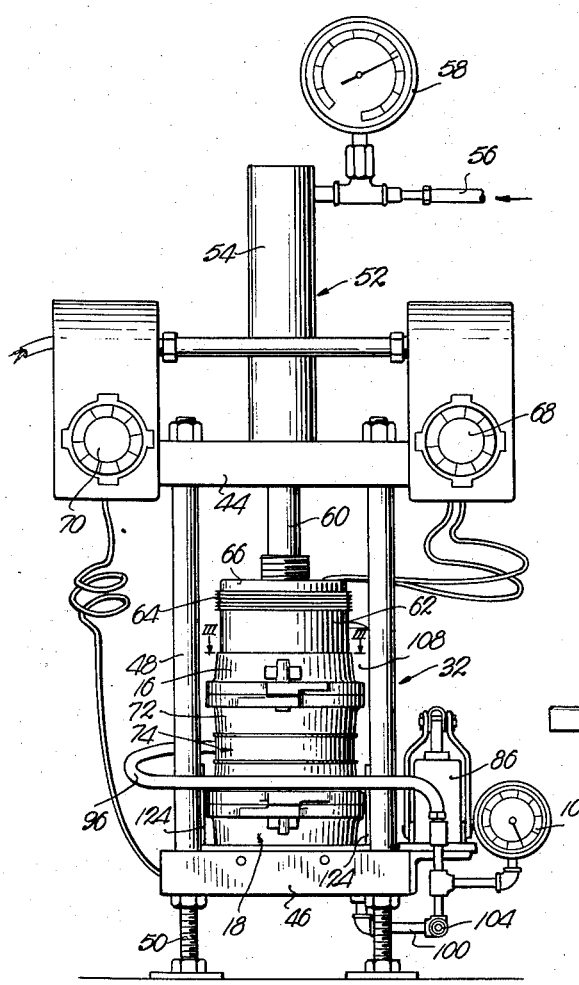
Figure 1 is a front elevational view of apparatus for making dental appliances made pursuant to my present invention.
Fig. 2 is a side elevational view thereof.
Fig. 10 is a fragmentary, elevational view illustrating the use of the apparatus in removing the investment from one of the flask sections.
Fig. 11 is a view similar to Fig. 10 illustrating the manner of removing the investment from the other flask section.

Those skilled in this art are familiar with the initial steps commonly employed in the manufacture of artificial dental appliances, and while the apparatus of the instant invention will be hereinafter outlined in accordance with the procedures to be employed for the manufacture of complete dentures, it is understood that the principles thereof apply equally well to the production of partial dentures and other types of artificial restoration.

Accordingly, in the usual manner, a negative impression of the user's mouth will be taken from which is produced a positive model, pattern or cast and which cast is designated by the numeral 12 in Fig. 4 of the drawing.

Any suitable material such as wax may be used in the shaping of a base plate (not shown) over the cast 12 whereupon artificial teeth are mounted on such base plate in the usual manner. Normally, the dentist will then adjust the teeth within the base plate by a trial fit within the mouth of the user and thereupon the permanent denture can be produced according to the steps about to be outlined.

The said base plate is then attached to the cast 12 in the usual manner through use of a removable substance such as wax and the cast 12 is invested with a suitable casting material presenting a mold section 14 within one section 16 of a flask broadly designated by the numeral 18. If desired, the last mentioned casting step may precede the waxing of the base plate to the cast 12.

After the investment forming the molding section 14 has hardened, edge 20 of flask section 16, as well as land area 22 of investment 14 adjacent the edge 20 and adjacent the base plate, are covered with a removable substance such as wax. The base plate, together with artificial teeth 24, are then invested within a casting material presenting a second mold section 26 within flask section 28.

Following the hardening of the investment forming the mold section 26, the two sections 16 and 28 of flask 18, as well as the two mold sections 14 and 26, are separated and all of the wax forming the base plate, as well as the wax that was placed along land area 22 and edge 20, are removed, leaving cast 12 in the initial condition and leaving the teeth 24 firmly embedded within the mold section 26.

The flask section 28 is invested while the two sections 16 and 28 are together, it being noted that flask section 28 is provided with a removable cover 30 to permit such operation. When cover 30 is placed on the flask 18, press 32 may be employed, together with knockout tool 34 (Figs. 10 and 11) to force cover 30 into place, the excess investing material 26 flowing out of opening 36 formed in the cover 30.

It is advisable to thereupon coat the mold sections 14 and 26 with an alginate separating medium to facilitate removal of the completed denture. Thereupon the mold section 26 is packed with a polymeric denture base material 38 completely covering the teeth 24, following which the flask sections 16 and 28, and the mold sections 14 and 26, are reassembled in the manner illustrated in Fig. 4. When the flask 18 is compressed within the press 32, the denture base material 38 not only distributes evenly over the cast 12, but flashes outwardly between the mold sections 14 and 26 between the edges of the flask sections 16 and 28. The said edges of the flask sections 16 and 28 are provided with opposed annular grooves 40—42 respectively for receiving the material 38 and thereby presenting a positive seal.

In this respect it is to be pointed out that the material 38 flashes between the flask sections in a relatively thin membrane that is easily pinched and broken by the pressure between the edges of the flask sections. Accordingly, by virtue of the annular grooves 40 and 42 for receiving the flash, there is not only presented a positive seal, but the material 38 is held in place against radial inward slippage that would otherwise occur during shrinkage as a result of polymerization.

Press 32 includes a pair of vertically spaced platens 44 and 46 interconnected by a plurality of tie rods 48 and supported by a number of adjustable feet 50. Pressure means 52 in the nature of a hydraulic or pneumatic piston and cylinder assembly, includes a cylinder 54 carried by the platen 44 and having a vertically reciprocable piston (not shown) therewithin.

Pipe 56 coupled with the cylinder 54 and with a suitable source of fluid pressure, has a pressure gauge 58 interposed therein. Piston rod 60 depending from the cylinder 54 is provided with a pressure head 62, a plurality of heat dissipating fins 64 and a heating plate 66 that is operably coupled with a source of electrical energy through a thermostatic control 68. Platen 46 is also provided with a heating element (not shown) adjacent the uppermost surface thereof that is operably coupled with a thermostatic control 70.

As is clear in Figs. 1, 2 and 4, the press 32 is adapted to not only receive the flask 18, but a second flask 72, the latter of which is inverted before insertion within the press 32 beneath head 62.

A manifold broadly designated by the numeral 74, is interposed between the flasks 18 and 72 and rests directly against covers 30 and 76 for flasks 18 and 72 respectively. Manifold 74 has a central port 78 that surrounds boss 80 on cover 30 in sealing relationship to an O-ring 82, the latter of which surrounds boss 80 and opening 36 being formed in boss 80 as seen in Fig. 4. Manifestly, the cover 76 is made in the same manner for receiving manifold 74 and particularly, the port 78 of the latter. An additional O-ring 84 on the cover 30 within the flask section 28 provides a tight seal between cover 30 and the flask 18.

The platen 46 carries a manually operable pump 86 having its inlet connected with a source of fluid such as water, by a supply line 88. In this connection, the line 88 may be either connected directly with a source of water pressure or with a water supply tank (not shown) and a check valve 90 in the line 88 prevents reverse flow of the water toward the source thereof during operation of pump 86.

A pipe 92 connected with the outlet of pump 86 has a check valve 94 interposed therein for preventing back-flow of the fluid pressure from manifold 74 to the pump 86. Manifold 74 is coupled with the pipe 92 by a flexible hose 96.

Pipe 92 is also connected with an accumulator 98 for maintaining pressure within the flasks 18 and 72, through the medium of a conduit 100 having a pressure gauge 102 interposed therein. A drain pipe 104 joining with conduit 100 has a manually controlled shut-off valve 106.

The accumulator 98 includes a cylinder 108 having a floating piston therewithin (not shown), together with a compressible medium (either gas or liquid) above such piston, the accumulator 98 being charged with such compressible fluid at a predetermined pressure. As shown in Figs. 6 and 8, the hose 96 communicates with the port 78 through a single bore 110 formed in the manifold 74.

The manifold 74 is additionally provided with coolant-receiving passage means in the nature of opposed grooves 112 and 114 in the upper and lower faces thereof, both of which have a spiral configuration as seen in Fig. 6. The innermost and outermost ends of the grooves 112 and 114 are interconnected by T-shaped bores 116 and 118 respectively that are in turn connected with coolant-receiving hoses 120 and 122. It is understood that one of the hoses 120—122 may be joined with a source of water pressure for example, as the other of such hoses 120—122 serves to drain the coolant from the grooves 112 and 114. Such construction also adapts the apparatus for connection with a closed coolant recirculating system if desired.

When the two flasks 18 and 72 are placed in the press 32 in the manner illustrated by Fig. 4 with the manifold 74 therebetween, pressure means 52 is initially actuated through a suitable control for line 56 (not shown) to compress the flasks 18 and 72 between head 62 and platen 46, to a predetermined pressure, readable on gauge 58, for a short period of time. After the flash of material 38 ceases flowing from between flask sections 16 and 28 and corresponding sections of flask 72, the pressure should be increased; when the material 38 ceases to flow, the pressure should be increased still higher.

After closing waste valve 106, water is forced into the flasks 18 and 72 through use of pump 86 until the pressure, as seen on gauge 102, reaches a desired reading, which should be maintained during the curing period. During the time the pressure is maintained on the flasks 18 and 72 by pressure means 52, and while the water pressure is maintained in the flasks 18 and 72, the heating means within disc 66 and within platen 46 should be maintained at the proper setting, readable on thermostats 68 and 70.

During such curing of the material 38, the water pressure thereon is maintained by virtue of the accumulator 98 notwithstanding the relative incompressibility of the fluid within the flasks, the hose 96, pipe 92, conduit 100 and cylinder 108 below the piston in the latter. While water is preferred, if other fluid mediums are employed which are more readily compressed than water, the accumulator 98 may be eliminated.

It is seen from the foregoing that the water pressure acts upon the material 38 in the manner illustrated by the arrows in Fig. 4, pressing the latter tightly against the pattern 12 and holding the same in firm engagement therewith during the curing or polymerization of the material 38. As more fully explained in my copending application, such maintained pressure on the material 38 prevents shrinkage and consequent pulling away from the pattern 12 with a consequent misfit in the mouth of the patient from which the original impression was made.

By virtue of the fact that the investment 26 is permeable to the flow of the fluid, it permits the fluid to impinge upon the entire oral surface of the appliance. Additionally, by virtue of the seal that is provided by the impermeable material 38 between the two sections of the flask, the water pressure is not permitted to permeate the casting material forming pattern 12 and investment 14 to thereby raise the appliance out of firm engagement with the pattern.

It is recognized however, as explained in my copending application, that the technique is equally applicable through use of the apparatus illustrated in the drawings, to the production of dental appliances other than complete dentures, in which event it is to be preferred that the material forming the pattern 12 and the investment 14, be impermeable to the flow of water. A proper material may be chosen or conventional investment substances treated by coating or saturation to render the same waterproof. A single open top vessel, having a cover 30, may be employed in lieu of a two-part flask, and under such circumstances the flow of fluid around the investment 14 is of no consequence. The appliance and the cast upon which it is mounted are in effect then cured within a water bath and shrinkage prevented by the maintained pressures since the water is unable to seep in between the appliance and the cast.

Notwithstanding the fact that the appliance is held tightly against the pattern during curing, there is still a tendency of pulling away from the pattern during cooling, if such cooling is not properly controlled. Normal procedures contemplate removal of the flask from the press and rather rapid cooling, as for example, by simply immersing the same in a cold water bath.

It is preferred however, in accordance with the techniques of the instant invention, to gradually and progressively lower the temperature of the flasks and, therefore, the contents thereof following complete polymerization through use of the manifold 74. After curing, the heaters are deenergized. Thereupon, coolant is directed through the passages 112 and 114 continuously for a desired period of time until the temperature of the flasks has been appreciably lowered. It is to be preferred that the temperature drop be gradual, but more important, such cooling step should take place while the pressure is maintained on the flasks by pressure means 52 and by the fluid within the flask section 28.

Finally, the water pressure on the flasks is relieved by opening the waste valve 106 and pressure means 52 is actuated to permit removal of the flasks from the press 32. The flask sections are separated and the investments therein contained are forced from the flask sections through use of the press 32 in the manner illustrated by Figs. 10 and 11.

Platen 46 is provided with a pair of spaced, upstanding pins 124 adapted to receive ears 125 of flask section 28 in the manner illustrated in Fig. 10, and after removal of cover 30 therefrom, the base end of frustoconical knockout tool 34 is placed on the investment 26 beneath head 62 to press the investment 26 and the dental appliance downwardly from within the flask section 28.

The same procedure is employed to remove the investment 14 and the pattern 12 from the flask section 16, the latter being provided with a removable plate 126 receiving the apex end of the tool 34 as ears 128 on flask section 16 rest on pins 124.

In the event it is desired to use the flask 18 alone in the press 32, in absence of flask 72, it is but necessary to superimpose a gasket such as a sheet of paper over the manifold 74 beneath head 62 in closing relationship to the upper end of port 78 and the uppermost spiral coolant-receiving grooves.

Those skilled in this art will appreciate the impracticability of specifying temperature and pressure ranges in connection with the methods above set forth since such ranges depend upon many variable factors. For example, temperature depends upon the nature of the denture material as well as curing time. Some materials permit or require high temperatures, permitting completion of the appliance in a short period of time. Other materials produce best results at lower temperatures maintained for longer periods.

Similarly, the recommended pressures, not only on the flasks themselves, but more particularly on the investment by the fluid emanating from the manifold, cannot be standardized. The thickness of the denture material on the cast has a direct bearing on fluid pressure, as does the extent of shrinkage of a given substance.

Still further, it is to be stressed that the strength of the investment itself has a direct bearing on the pressures that should be employed. It is to be desired that the pressures not be so great as to produce any material compression of the investment within which the cast is invested or of the materials from which the cast itself is made. Such yielding of these materials to pressure has a deleterious effect on proper fit and should be avoided either by decreased pressures or selection of materials capable of withstanding the pressures necessary to prevent shrinkage of the denture materials.

Having thus described the invention what is claimed as new and desired to be secured by Letters Patent is:

1. In apparatus for making dental appliances, the combination of a press having a pair of spaced, interconnected platens; pressure means carried by one of said platens for movement toward and away from the other platen; a flask adapted to receive a cast, a layer of a self-curing, polymerizable substance over the cast and liquid permeable investment material filling the remaining portion of the flask above said layer of substance and interposed between said other platen and said pressure means and provided with an inlet opening above said layer of substance; a manifold clamped between the flask and the pressure means whereby a predetermined pressure is applied to the flask, said manifold being in register with said opening for directing a fluid into the flask and pump means coupled with said manifold for automatically maintaining a constant fluid pressure on said layer of substance and for supplying additional fluid to the flask as the layer of substance undergoes volumetric shrinkage.

2. In the invention as set forth in claim 1 wherein is provided a fluid line coupled with said manifold and provided with a check valve for preventing reverse flow of fluid in the line from the manifold; and accumulator means interposed in said line between the manifold and the check valve for assuring maintenance of said constant fluid pressure on said layer of substance.

3. In the invention as set forth in claim 2 wherein said accumulator means comprises a piston and cylinder assembly having the cylinder thereof coupled with said line on one side of the piston thereof, there being a compressible medium in the cylinder on the opposite side of the piston.

4. In the invention as set forth in claim 1 wherein said manifold is provided with passage means in thermal exchange relationship with the flask adapted for circulation of a coolant therethrough whereby to cool the flask.

5. In the invention as set forth in claim 4 wherein is provided a fluid line coupled with said manifold and accumulator means and interposed in said line between the manifold and said pump means for assuring maintenance of said constant fluid pressure on said layer of substance.

6. In the invention as set forth in claim 4 wherein said manifold has a fluid port communicating with said opening, said passage means comprising a spiral groove in one face of the manifold in thermal exchange relationship with the flask, surrounding the port and provided with an inner and an outer end, there being a coolant bore in the manifold connected with each of said ends respectively.

7. In apparatus for making dental appliances, the combination of a press having a pair of spaced, interconnected platens; pressure means carried by one of said platens for movement toward and away from the other platen; a pair of flasks interposed between said other platen and said pressure means, each adapted to receive a cast, a layer of a self-curing, polymerizable substance over the cast and liquid permeable investment material filling the remaining portion of the flask above said layer of substance and provided with an inlet opening above respective layers of substance; a manifold clamped between the flasks whereby a predetermined pressure is applied to the flasks by said pressure means; the manifold being in register with said openings for directing the fluid into the flasks; and pump means coupled with said manifold for automatically maintaining a constant fluid pressure on said layers of substance and for supplying additional fluid to each of the flasks as the respective layers of substance undergo volumetric shrinkage.

8. In the invention as set forth in claim 7 wherein said manifold is provided with passage means adjacent each flask respectively adapted for circulation of a coolant therethrough whereby to cool the flasks.

9. In the invention as set forth in claim 8 wherein said manifold has a fluid port therethrough communicating with the opening of each flask, said passage means comprising a spiral groove in opposed faces of the manifold adjacent corresponding flasks, each surrounding the port and each having an inner and an outer end, there being a coolant bore in the manifold connected with said inlet ends and a coolant bore in the manifold connected with said outlet ends.

References Cited in the file of this patent

UNITED STATES PATENTS

| 1,659,638 | Shapiro | Feb. 21, 1928 |
| 1,941,780 | Angell | Jan. 2, 1934 |
| 2,420,813 | Camerota | May 20, 1947 |
| 2,573,805 | Neustadter | Nov. 6, 1951 |

FOREIGN PATENTS

| 350,478 | Great Britain | June 8, 1931 |